United States Patent [19]

Wessel

[11] Patent Number: 4,700,535
[45] Date of Patent: * Oct. 20, 1987

[54] DRUM-TYPE WINDROWING MACHINE

[75] Inventor: Ulrich Wessel, Gottmadingen, Fed. Rep. of Germany

[73] Assignee: Klockner-Humboldt-Deutz AG Szeigniederlassung Fahr, Gottmadingen, Fed. Rep. of Germany

[*] Notice: The portion of the term of this patent subsequent to Jul. 22, 2003 has been disclaimed.

[21] Appl. No.: 852,283

[22] Filed: Apr. 15, 1986

Related U.S. Application Data

[63] Continuation-in-part of Ser. No. 713,520, Mar. 19, 1985, Pat. No. 4,601,162.

[51] Int. Cl.[4] ................... A01D 55/26; A01D 78/10
[52] U.S. Cl. ................... 56/13.6; 56/192; 56/370; 56/366
[58] Field of Search ............ 56/6, 13.6, 192, 370, 56/366, 376, 377, 384

[56] References Cited

U.S. PATENT DOCUMENTS

| | | | |
|---|---|---|---|
| 3,965,658 | 6/1976 | van der Lely | 56/192 |
| 4,030,275 | 6/1977 | Ruprecht | 56/192 |
| 4,104,851 | 8/1978 | Perry | 56/13.6 |
| 4,192,123 | 3/1980 | Allely | 56/192 |
| 4,269,019 | 5/1981 | Strobel | 56/370 |
| 4,601,162 | 7/1986 | Wessel | 56/13.6 |

FOREIGN PATENT DOCUMENTS

| | | | |
|---|---|---|---|
| 1944318 | 6/1969 | Fed. Rep. of Germany | 56/192 |
| 2426209 | 1/1975 | Fed. Rep. of Germany | 56/192 |
| 2539578 | 7/1984 | France | 56/192 |
| 436822 | 11/1967 | Switzerland | 56/192 |

Primary Examiner—Gene Mancene
Assistant Examiner—John Weiss
Attorney, Agent, or Firm—Karl F. Ross; Herbert Dubno

[57] ABSTRACT

A windrower has a transverse support positioned at an angle to the travel direction of the apparatus and attached by a towing bar to a tractor and the like. The transverse support is provided with a plurality of crop-transfer drums, which are attached rotatably under the transverse support parallel to each other, and displaced from each other. At least one crop-transfer drum is swingable about its adjacent crop-transfer drum 180° with respect to the axis of the adjacent crop-transfer drum in such a way that its axis retains its angle to the ground. Thus the crop-transfer drums have at least two configurations, in one of which all the crop-transfer drums are side-by-side with an equal spacing between adjacent drums of a width which is much smaller than the width of a crop-transfer drum, and in another in which there is at least one comparatively large gap between two adjacent crop-transfer drums substantially equal in width to the diameter of the crop-transfer drum.

10 Claims, 9 Drawing Figures

DRUM-TYPE WINDROWING MACHINE

CROSS REFERENCE TO RELATED APPLICATIONS

This application is a continuation-in-part of Ser. No. 713,520 of Mar. 19, 1985 now U.S. Pat. No. 4,601,162.

FIELD OF THE INVENTION

My present invention relates to a drum-type windrower as an attachment or implement for a tractor or the like and, more particularly, to a machine which can produce a plurality of swaths or windrows parallel to each other from a previously mown crop such as hay or straw for subsequent pickup and/or baling.

BACKGROUND OF THE INVENTION

Rotary moving and tedding or windrowing machines can have a transverse support attached by a towing bar to a tractor and oriented at an angle to the travel direction and a plurality of mowing drums, parallel to one another under the transverse support and rotatable on it. They are offset from one another in the travel direction and their working zones overlap.

Such implements are used particularly in hay harvesting, wherein the dried hay or crop must be formed in a swath. With the windrowing drums driven in the same rotational direction on a bar inclined with respect to the travel direction, the dried hay or crop is conveyed along the entire width of the side-by-side mowing drums and form a swath or windrow beside the final moving drum. This kind of comparatively large swath or windrow can be picked up subsequently by a transport vehicle, e.g. a chopper, blower or baler.

The advantage of a rotary drum windrowing attachment as opposed to a hay harvesting machine with raking wheels is that the once cut hay or crop is carefully handled, because of the elastic structure of the mowing drum, which, for example, can comprise rubber members, and also because of the lack of metal teeth which can be broken off and can damage the subsequent further processing machines and which can ultimately reach the cattle or other animals.

In U.S. Pat. Nos. 4,269,019 and 4,030,275 the structure of such mowing drums is described.

These mowing drums generally comprise a cylindrical portion attached above an outwardly flared skirt which has a plurality of cutting blades. The drums rotate about a central shaft attached to a generally circular slide disk or convex plate positioned below the flared skirt with the cutting blades so as to keep the blades from the ground. Both these above-mentioned prior art patents describe inventive structures applicable to a single mowing drum which assist the mower in properly forming a swath or windrow. U.S. Pat. No. 4,269,019 describes a plurality of tines which are attachable horizontally to the cylindrical portion of a mowing drum to help ted the crop. U.S. Pat. No. 4,030,275 describes a flap or deflection plate attached adjacent the mowing drum to help form a proper swath or windrow and an improved flared skirt having a plurality of ridges which pass adjacent the lower edge of the deflection plate, wherein the ridges form an acute angle with the deflection plate when viewed from above down the rotation axis of the mowing drums. The ridge structure assists in preventing troublesome clogging of crop or hay between the deflector plate and the flared skirt.

A hay or crop harvesting machine with a pair of raking wheels, which are supported by means of rollers movable on the ground, these wheels being mounted at the ends of a cross bar arm swingable in a horizontal plane and driven about vertically oriented axes, is taught in Swiss Pat. No. 499 254.

In this hay harvesting machine a first raking wheel is fixed with respect to the travel path of the hay harvesting machine, while a second raking wheel is shiftable from one side of the first raking wheel to the other side of the first raking wheel by means of a cross bar arm and on each side the second raking wheel is securable in position. So when the second raking wheel is pivoted to the first side position, each raking wheel works independently, that is, it can form at low rotary speed two swaths or bundles or at high rotary speed it turns over the product, while, when the second raking wheels is swung out to the second side position both raking wheels cooperate, so that the crop or hay cuttings are directed from the first raking wheel to the second, whereby a single correspondingly larger swath is formed.

For the shifting of the second raking wheels, however, the entire transverse support, to which both raking wheels are associated, must be pivoted about its pivot axis in a horizontal plane behind the tractor.

Dispensing with metallic teeth, which have several inherent disadvantages, in these known hay harvesting machines, the raking wheels are movable each by a supporting roller on the ground, which with an arm are pivotally supported on a bracket, wherein the rear raking wheel must be provided with an additional trailer roller or caster, which is attached with an attachment member to the bracket. In pivoting of the arm with both raking wheels attached to it, in order that the supporting rollers of the rear raking wheel be put in the new working position parallel to the longitudinal travel axis, the position locking mechanism of the positioning segments of the rear raking wheels on the cross bar arm must be correspondingly changed.

OBJECTS OF THE INVENTION

The principal object of the invention is to provide a rotary-drum-type windrowing attachment with which, in a careful way, both a single comparatively large swath or windrow can be formed from a previously mown crop as well as several comparatively smaller swaths or windrows parallel to each other and which is convertible between these two working configurations with comparatively few, simple hand manipulations.

It is an object of my invention, therefore to provide an improved rotary drum windrower for a tractor.

It is also an object of my invention to provide an improved rotary drum windrowing implement for a tractor with a more versatile construction than earlier swath-forming machines and which obviates drawbacks thereof.

Another object of this invention is to extend the principles of the abovementioned application.

SUMMARY OF THE INVENTION

These objects and others which will become apparent hereinafter are attained in accordance with my invention in a windrower or tedder comprising a transverse support attached by a towing bar to a tractor and oriented at an acute angle to the travel direction of the rotary drum windrowing attachment and a plurality of crop-transfer drum, which are mounted parallel to each other under the transverse support and are rotatable on it, so that they are offset from each other in the travel direction and their work zones overlap. These drum can be of the type provided in Swiss Pat. No. 499,254 or French patent publication No. 2,537,578.

According to the invention at least one of the crop-transfer drums is swingable substantially through 180° around the upright axis about which a neighboring crop-transfer drum is rotated, while the angle of the axis of the crop-transfer drum which is swung with respect to the ground is maintained substantially unchanged.

Thus the crop-transfer drums of this invention can be put into at least two configurations: one in which the crop-transfer drums are lined up side-by-side below the transverse support positioned comparatively closely to each other so that they produce one comparatively large swath or windrow, and another configuration in which one of the crop-transfer drums is pivoted from between two adjacent crop-transfer drums to form a gap substantially equal in width to the diameter of a crop-transfer drum so that the crop-transfer drums produce two smaller swaths or windrows. Similarly other crop-transfer drums may be pivotable and a plurality of smaller swaths or windrows may be formed.

According to a preferred embodiment of my invention a first, second, third and fourth crop-transfer drums are employed. All of the crop-transfer drums are driven rotatably in the same rotational direction. The fourth crop-transfer drum is positioned furthest to the rear in the travel direction of the rotary crop-transfer attachment and the third crop-transfer drum is positioned next to the fourth crop-transfer drum. The second crop-transfer drum is pivotable about the first crop-transfer drum from a position between the first and third crop-transfer drums so as to form a gap between the first and third crop-transfer drums.

In another embodiment of my invention as above a first, second, third and fourth crop-transfer drum are used and all the crop-transfer drums are rotated in the same rotational direction. The first crop-transfer drum is positioned furthest forward of all the crop-transfer drums in the travel direction of the windrower, the second crop-transfer drum is positioned adjacent the first crop-transfer drum, and the third crop-transfer drum is pivotable about the fourth crop-transfer drum from and to a position between and adjadent the second and fourth crop-transfer drums so as to form a gap between the second and fourth crop-transfer drums.

In yet another embodiment of my invention a first, second, third, fourth, fifth, and sixth crop-transfer drum are positioned side-by-side under the transverse support and the third crop-transfer drum is positioned next to the fourth crop-transfer drum, and the second crop-transfer drum is pivotable around said first crop-transfer drum from and to a position between the first crop-transfer drum and the third crop-transfer drum and the fifth crop-transfer drum is pivotable about the sixth crop-transfer drum from and to a position between the fourth and sixth crop-transfer drums, so that two gaps between the crop-transfer drums and correspondingly two swaths or windrows can be formed.

Further features of my invention include an auxiliary support under which the forward most pair of crop-transfer drums in the travel direction of the windrower are rotatably mounted. This auxiliary support is generally lower than the transverse support but parallel to it and is conveniently pivoted about the rotation axis of the crop-transfer drum adjacent this forwardmost pair of crop-transfer drums.

In the configuration in which only one comparatively large swath is formed, this forwardmost pair of crop-transfer drums mounted lower than those mounted on the transverse support directly is adjacent a smaller amount of crop or grass cutting, while the higher crop-transfer drums are adjacent the comparatively greater volume of crop or grass cuttings. Adjacent the rear most crop-transfer drum in the travel direction of the windrower a vertical swath board is mounted and spaced therefrom, which does not need to be detached for shifting to the configuration in which two smaller swaths are formed or its reverse.

Further, of course, when more than four crop-transfer drums are utilized, two auxiliary supports employing two crop-transfer drums can be positioned at each end of the transverse support pivotally. These auxiliary supports provide a convenient means to pivot the pivotable crop-transfer drums.

Further advantageously all of the crop-transfer drums of my invention are advantageously driven rotatably by a V-belt drive, and the direction of rotation of the crop-transfer drums which pivot remains unchanged on pivoting. The V-belt drive of course may derive power from the tractor drive.

It is especially desirable to incline the vertical axes of the corp-transfer drums at a sufficiently acute angle to the ground so that the lower front edges of the crop-transfer drums in the travel direction of the windrower touch the ground.

It is particularly advantageous that under at least every second crop-transfer drum a centrally oriented wheel (see French patent publication No. 2,539,578) is provided, so that after pivoting one of the crop-transfer drums having the wheel thereunder has the same spacing from the ground as before pivoting.

Furthermore the spacing between the swath board and the last crop-transfer in the travel direction of the windrower is advantageously adjustable.

With my invention the advantage is attained that with few hand manipulations, that is, by a single swing of the auxiliary support about its rotation axis, windrower is changed to a configuration in which serveral smaller swaths or windrows parallel to each other can be formed. Thus an enlargement of the operating surface of the windrower is also provided by pivoting its pivotable crop-transfer drums.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
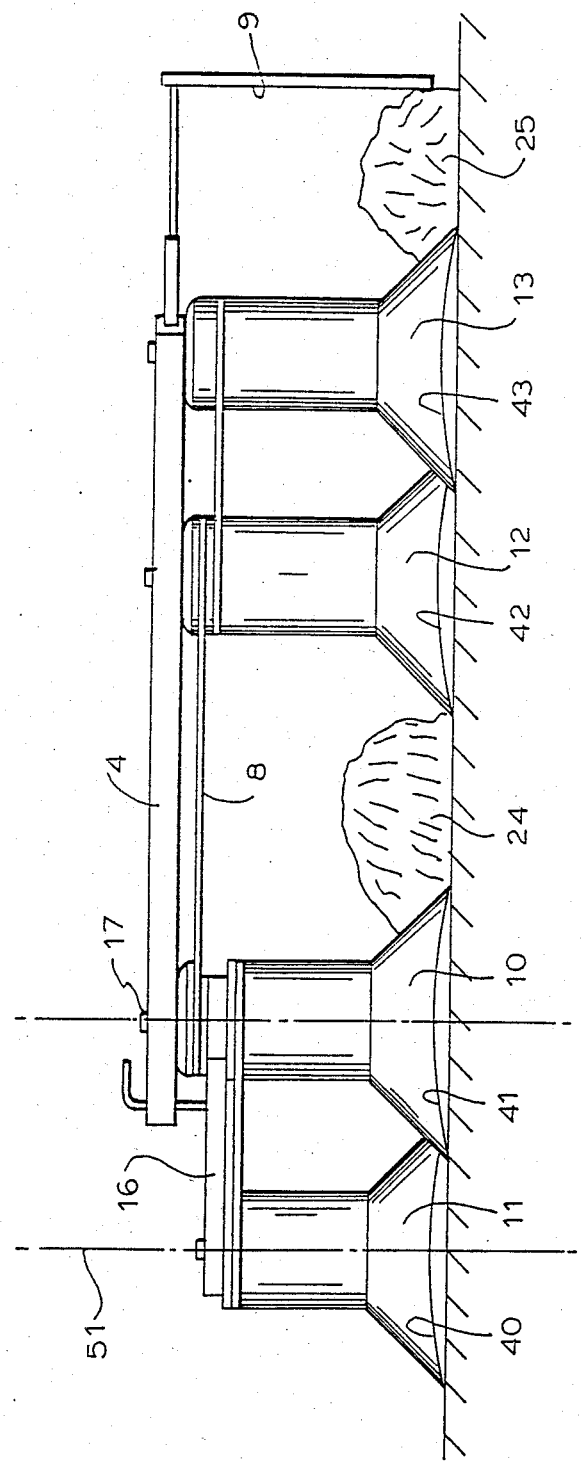
FIG. 1 is a schematic rear view of a preferred embodiment of a windrower according to my invention having four crop-transfer drums seen in a configuration in which two swaths or windrows are produced.
Figure 2:
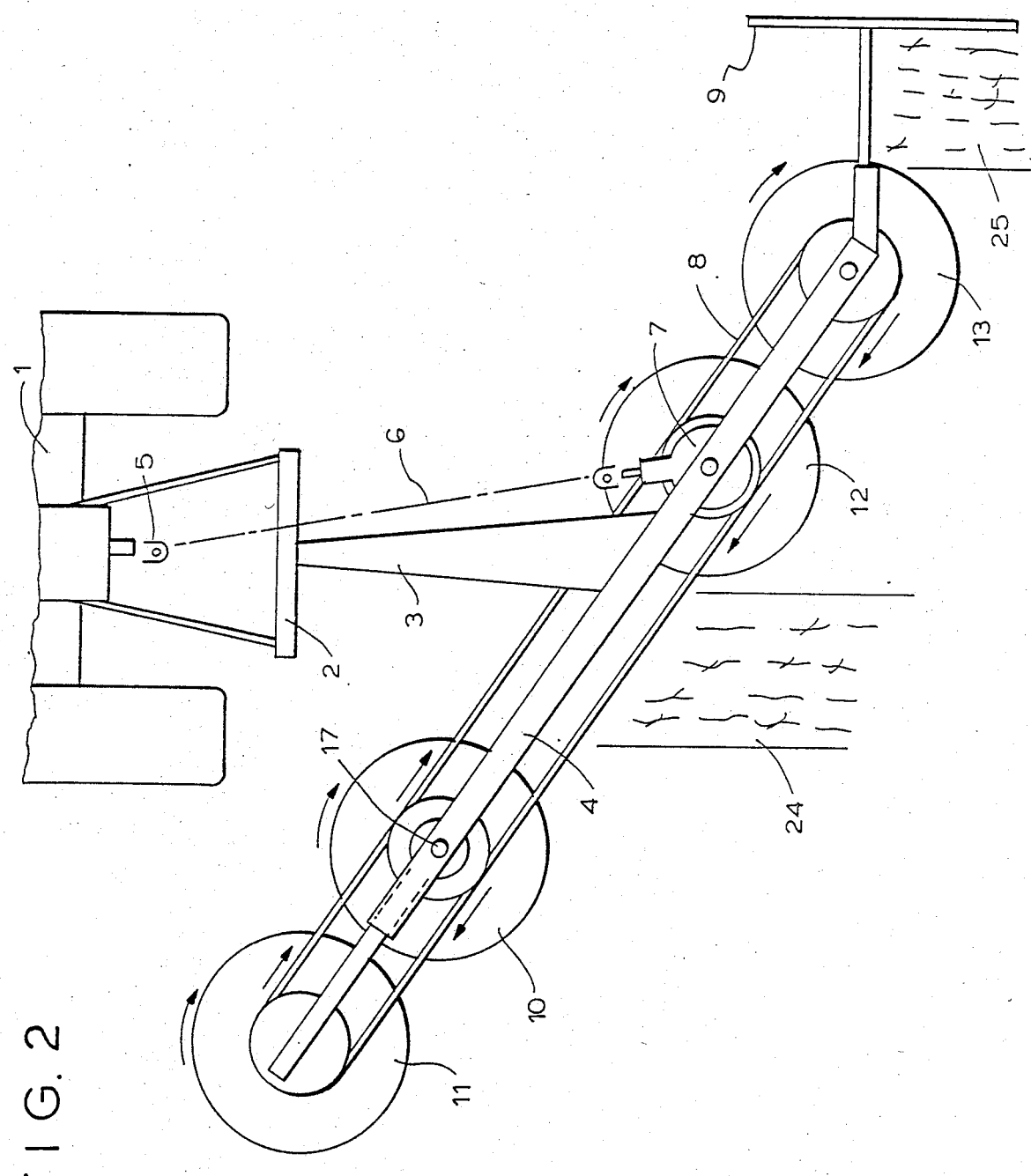
FIG. 2 is a schematic top view of the apparatus according to FIG. 1.

A windrower with four crop-transfer drums 10, 11, 12 and 13 is shown in FIGS. 1 and 2 being pulled by a tractor 1 not shown in complete detail. The windrower has a towing bar 3 by which it is attached to a hitch assembly 2 of the tractor 1. On the towing bar 3 generally oriented in the direction of travel of the windrower, a transverse support 4 oriented at a fixed acute angle to the travel direction of the windrower is attached in a horizontal plane, under which in the preferred embodiment four crop-transfer drums 10, 11, 12, and 13 are rotatably attached so as to extend to the ground. The drums can be smooth surfaced or provided with crop engaging formations as described in the aforementioned French or Swiss patent publications.

On a rotating power take-off shaft 5 of the tractor 1 is a rotational coupling to an angle drive (bevel-gear drive) 7 positioned on a transverse support 4. The angle drive 7 drives a V-belt drive 8, which jointly drives the crop-transfer drums 10, 11, 12, and 13 in the same direction of rotation as indicated by the arrows in FIG. 2.

Figure 3:
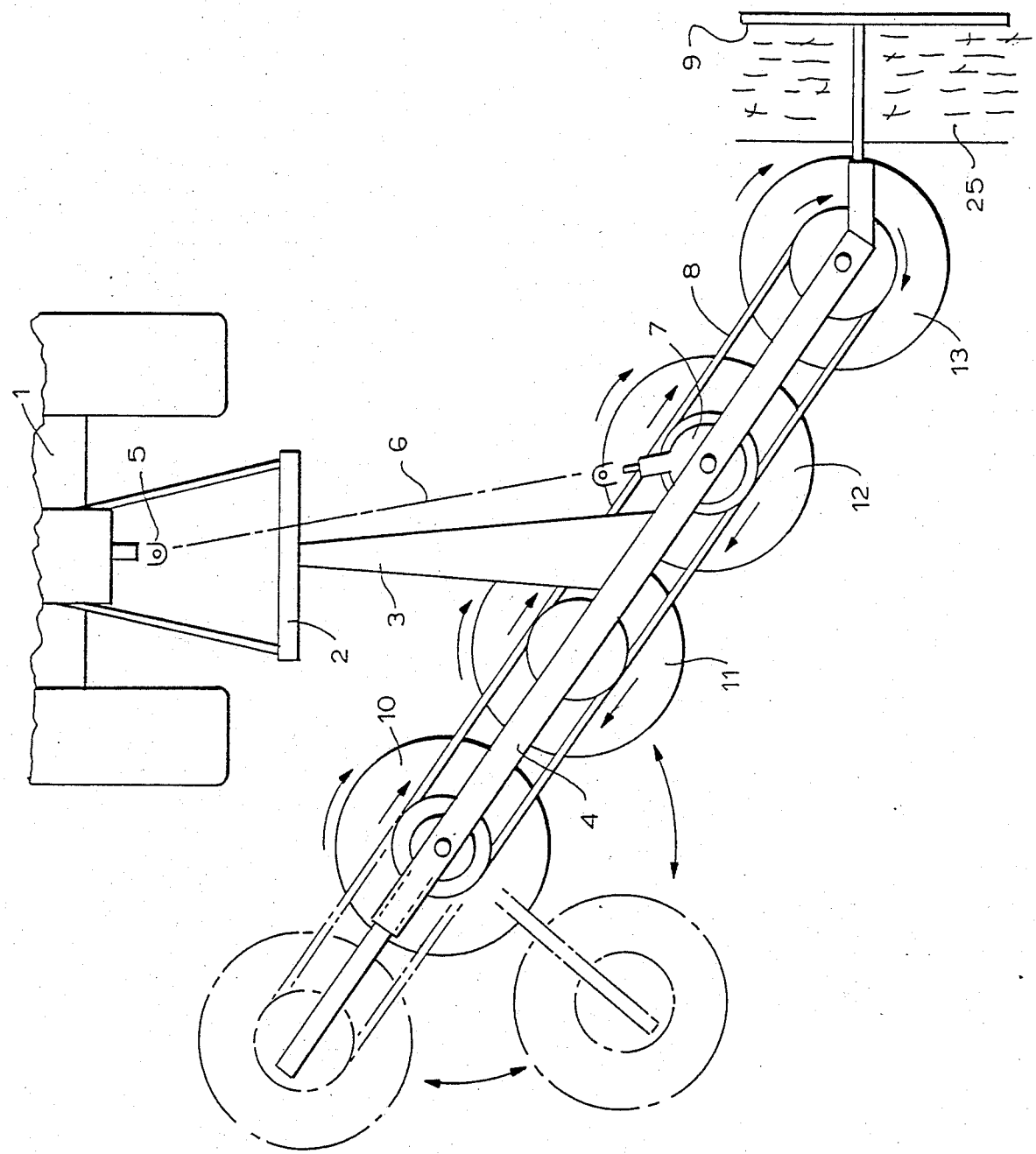
FIG. 3 is a schematic top action view of the apparatus according to the embodiment of FIG. 1 showing the four crop-transfer drums in a configuration in which one comparatively large swath or windrow is produced, and showing the pivoting crop-transfer wheel in broken lines.

By the transverse support 4 positioned at an angle to the travel direction of the windrower and the crop-transfer drums 10, 11, 12 and 13 arranged as shown in FIG. 3 directly next to each other side-by-side under transverse support 4 spaced from each other a distance much smaller than the diameter of a crop-transfer drum with their work zones overlapping, the crop or hay formed in a swath by the first crop-transfer drum 10, that is, the drum furthest forward in the travel direction in this configuration, and by all the adjacent crop-transfer drums 11, 12, and 13, is conveyed to the rear most crop-transfer drum 13 beside which it is formed into a swath or windrow 25. For better swath or windrow formation a swath board 9 can be provided adjacent the final crop-transfer drum 13, which is positioned with variable clearance from the outer circumference of the final crop-transfer drum 13.

In the configuration shown in FIGS. 1 and 2 instead of a single large swath or windrow, smaller swaths 24 and 25 formed parallel to each other are formed. Thus as shown in the FIGS. 1 and 3 the second crop-transfer drum 11 is swung around the first crop-transfer drum 10 about the axis 17 of the first crop-transfer drum 10, that is, the crop-transfer drum furthest forward in the direction of the windrower. All crop-transfer drums 10, 11, 12 and 13 including the axis 51 of the pivotable crop-transfer drum 11 maintain the inclination of their axes of rotation to the ground constant both before and after shifting from one configuration to the other. The shifting between the configuration of crop-transfer drums is particularly well shown in broken lines in FIG. 3, where one sees that a gap of a width substantially equal to the width of the pivotable second rotary mower 11 arises between the original first crop-transfer drum 10 and the third crop-transfer drum 12 so that parallel to the original swath or windrow 25, a second swath or windrow 24 is found lying parallel to it.

Figure 1B:
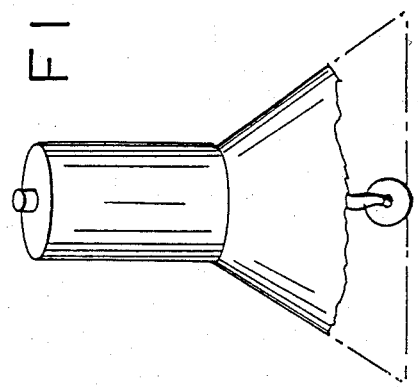
FIGS. 1A and 1B are perspective views of two drums which can be used in this embodiment.
Figure 1A:
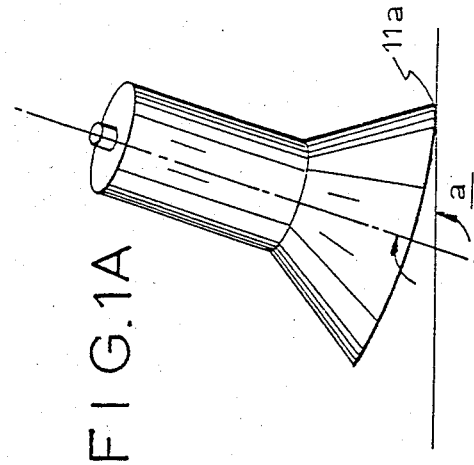

The axes of the crop-transfer drums 10, 11, 12, and 13 are inclined at an acute angle a to the ground (FIG. 1A). Thus the crop-transfer drums 10, 11, 12 and 13 are preferably tipped with their rear edges 40, 41, 42, and 43 tipped up and their front edges (11a) in the travel direction are inclined downward to touch the ground.

In order to be able to pivot the second crop-transfer drum 11 along a semicircle around the first crop-transfer drum 10, both these crop-transfer drums 10 and 11 are connected by an auxiliary support 16 positioned below and parallel to transverse support 4, whose pivot joint happens to be coincident with the axis 17 of the first crop-transfer drum 10. Both first and second crop-transfer drums 10 and 11 are attached lower than both crop-transfer drums 12 and 13 so that in the configuration of FIG. 3 in which a single large swath 15 is formed, that is, with the second crop-transfer drum 11 not pivoted around first crop-transfer drum 10 to form the aforementioned gap, both crop-transfer drums 10 and 11 work in the vicinity of a reduced amount of crop or cuttings, in contrast to the third and fourth crop-transfer drums 12 and 13 which work in the vicinity of larger amounts of crop or cuttings.

Figure 4:
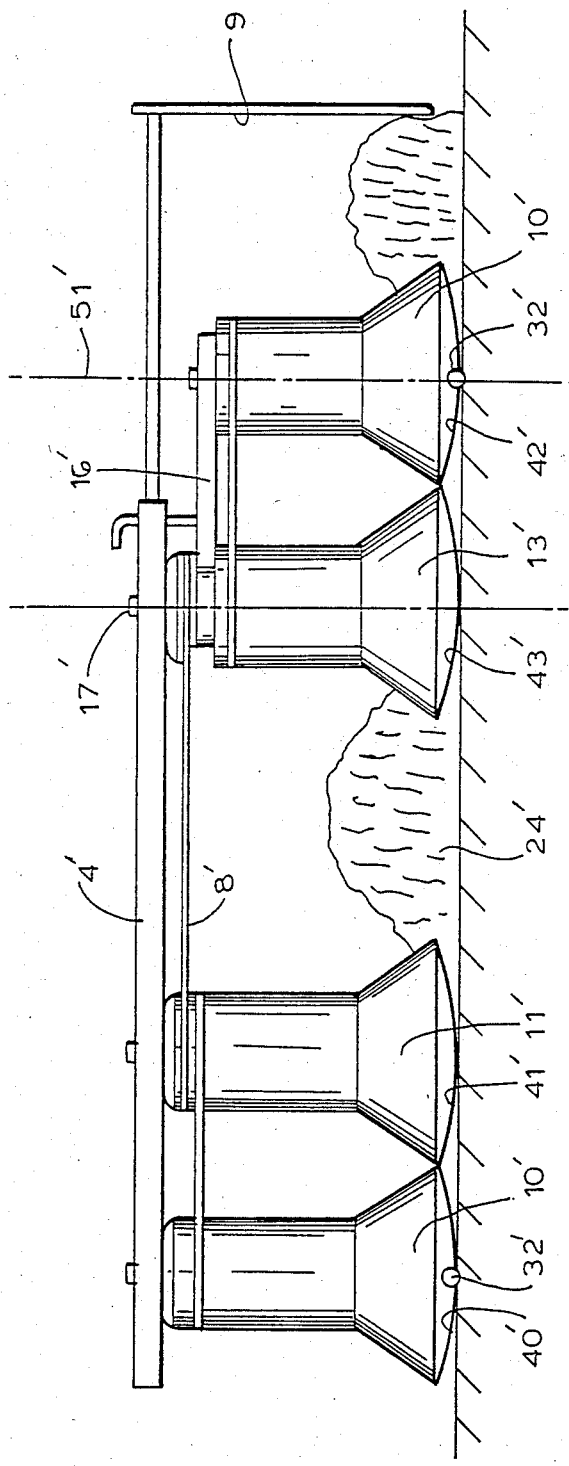
FIG. 4 is a schematic rear view of another embodiment of a windrower according to my invention also having four crop-transfer drums.
Figure 5:
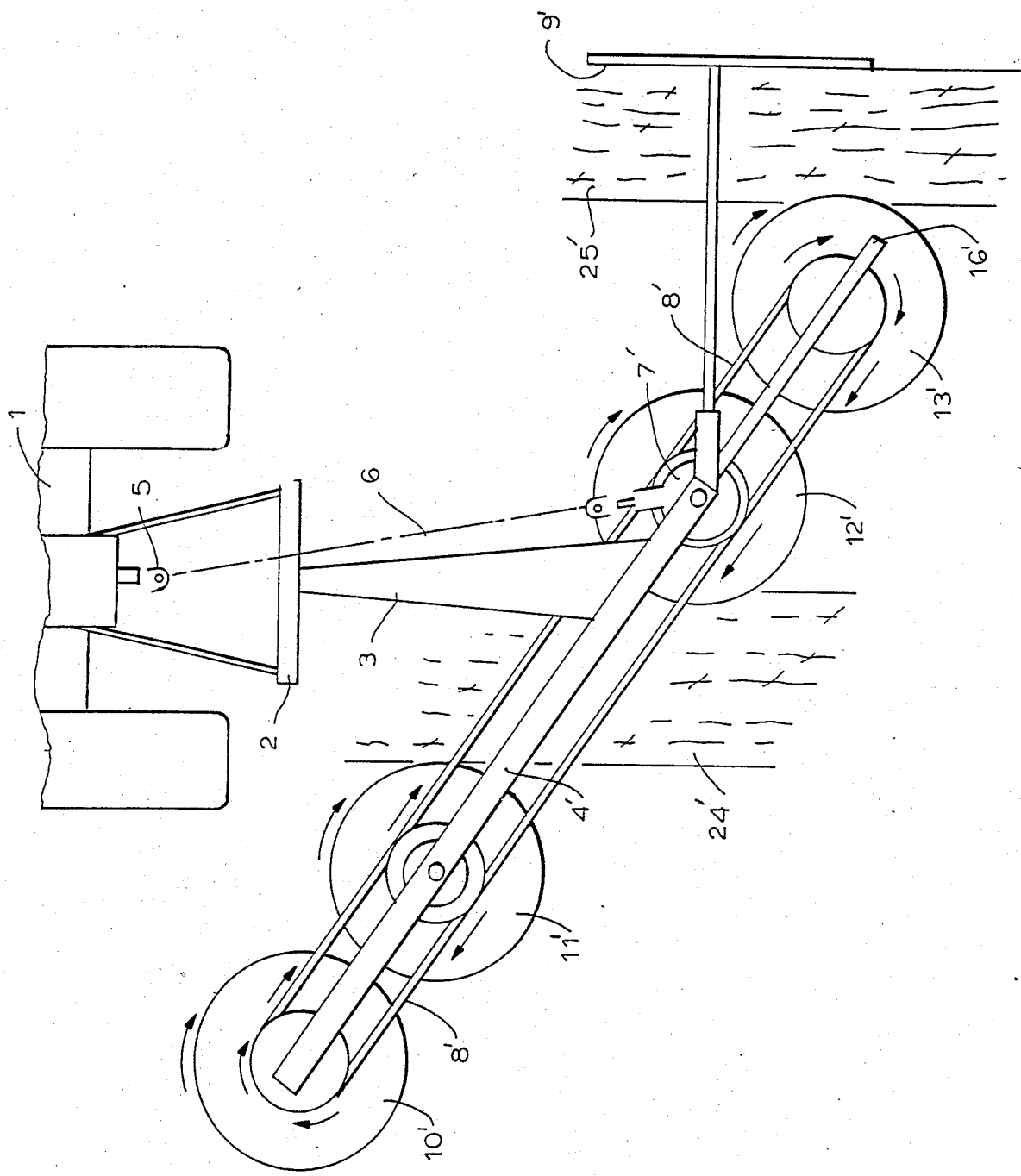
FIG. 5 is a schematic top view of the apparatus according to FIG. 4.

Another embodiment of my invention is shown in FIGS. 4 and 5 having four crop-transfer drums 10', 11', 12' and 13'. In this embodiment the third crop-transfer drum 12' is pivotable around the fourth crop-transfer drum 13' instead of the second crop-transfer drum 11' around the first crop-transfer drum 10' as in the above embodiment. Here the swath board 9 can still be positioned parallel to the travel direction of the windrower oriented vertically and attached to and supported by the transverse support 4. Only the configuration of the crop-transfer drums 10', 11', 12' and 13' from which two parallel swaths are formed is shown in FIGS. 4 and 5. As in the previous embodiment the crop-transfer drums 10', 11', 12' and 13' can be inclined at an acute angle to the ground slightly different from 90° so that the front edges of the crop-transfer drums 10', 11', 12', and 13 touch the ground.

Figure 6:
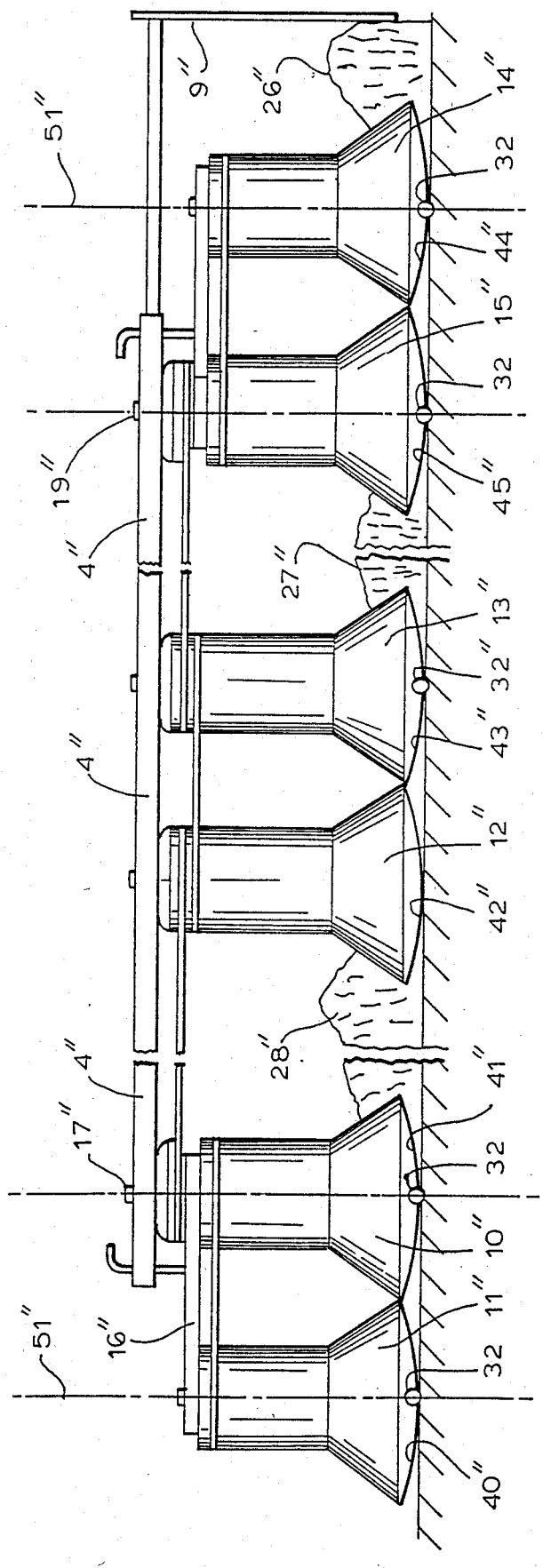
FIG. 6 is a schematic rear view of yet another embodiemnt of a windrower according to my invention having six crop-transfer drums.
Figure 7:
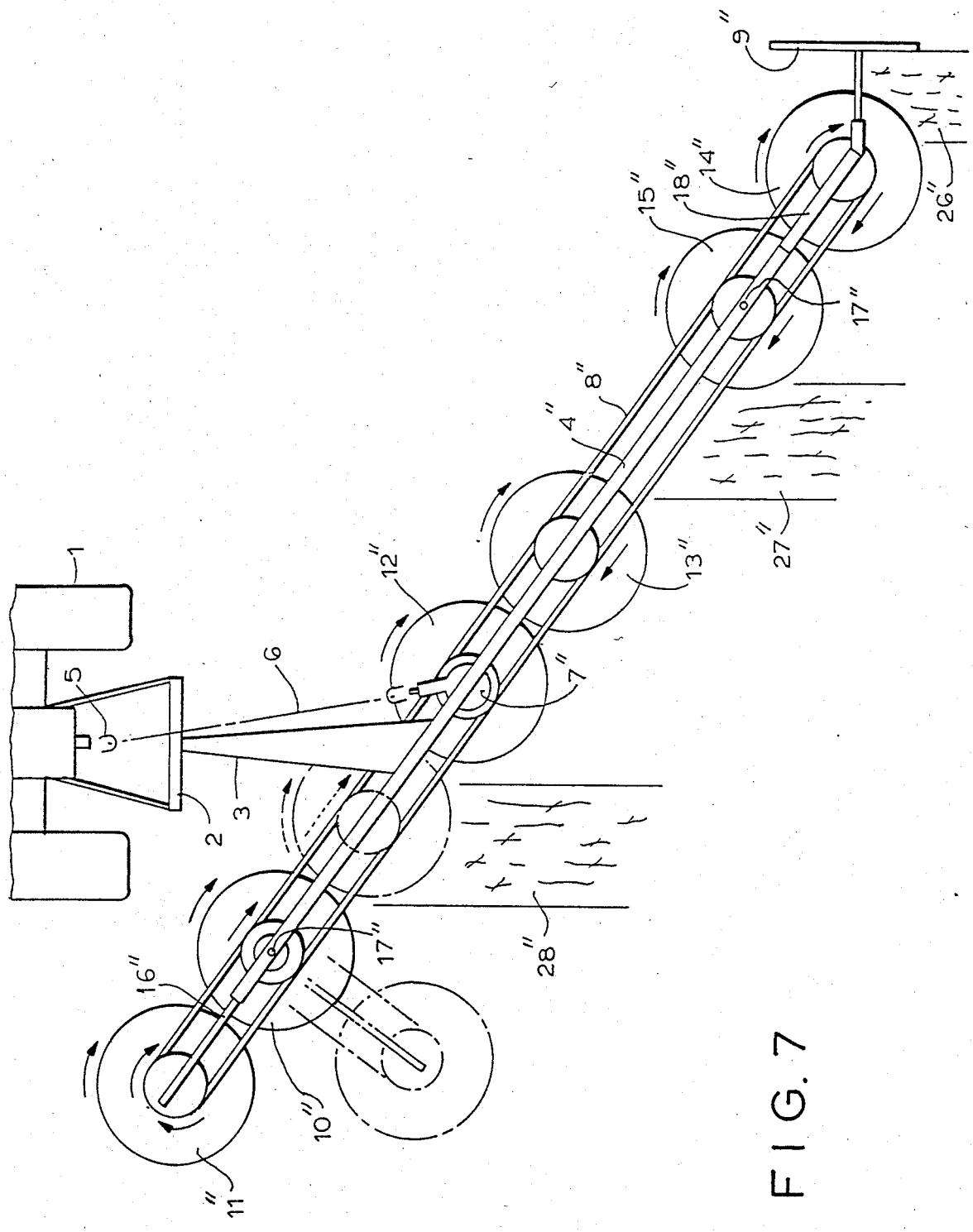
FIG. 7 is a schematic top view of the apparatus according to FIG. 6.

A third embodiment of my windrower is shown in FIGS. 6 and 7 having six crop-transfer drums 10", 11", 12", and 13", 14" and 15" attached rotatably under transverse support 4" and in the case of crop-transfer drum 11" directly under first auxiliary support 16" and in the case of crop-transfer drum 14" directly under second auxiliary support 18". First auxiliary support 16" is attached pivotally below and parallel to transverse support 4" and pivots about pivot point 17" which coincidently is the axis of rotation of first crop-transfer drum 10". Second auxiliary support 18" is attached pivotally below and parallel to transverse support 4" at the end opposite to the end that first auxiliary support 16" is attached. Second auxiliary support 18" pivots on pivot point 19" which is also coincidently the axis of rotation of the sixth crop-transfer drum 15". Thus in this embodiment both the second and the fifth crop-transfer drums 11" and 14" pivot around the first and the sixth crop-transfer drums 10" and 15" to form three configurations having no gap, one gap and two gaps so that in this embodiment one comparatively large swath, two smaller swaths or three even smaller parallel swaths or windrows 26", 27", and 28" can be formed at will.

Under every crop-transfer drum shown in the drawings or at least under every second crop-transfer drum a centrally located wheel 32' in FIG. 4 and 32 in FIG. 6 is provided (although not shown in the drawing), so that after swinging a pivotable crop-transfer drum 180° about the axis of the adjacent crop-transfer drum, the wheel is again oriented parallel to the travel direction of the windrower. Thus of couse the wheels 32 and 32' function to make the travel of the windrower easier and to maintain the distance between the lower edge of the crop-transfer drums and the ground. The wheel 32 is seen in FIG. 1B wherein a portion of a crop-transfer drum has been broken away.

I claim:

1. In a windrower for forming mown crop material into a swath and adapted to be drawn by a tractor, comprising a transverse support attached to said tractor by a towing bar orientable at an acute angle to a travel direction of said windrower, a plurality of crop-transfer drums attached under said transverse support parallel to each other so as to each be rotatable, said rotary crop-transfer drums being offset from each other in said travel direction of said windrower, the work zones of said rotary crop-transfer drums overlapping, the improvement which comprises means for swinging at least one of said crop-transfer drums through substantially 180° around an upright axis of a neighboring crop-transfer drum with the angle of an axis of the swingable crop-transfer drum with respect to the ground maintained unchanged.

2. The improvement according to claim 1 wherein said plurality of said crop-transfer drums comprises a first crop-transfer drum, a second crop-transfer drum, a third crop-transfer drum, a fourth crop-transfer drum positioned next to one another, all of said crop-transfer drums being rotated in the same rotational direction, said fourth crop-transfer drum being positioned furthest of said plurality of crop-transfer drums to the rear in said travel direction of said windrower, said third crop-transfer drum being positioned adjacent said fourth crop-transfer drum, said second crop-transfer drum being pivotable about said first crop-transfer drum from a position between and adjacent said first and third crop-transfer drums so as to form a gap between said first and third crop-transfer drums whose width is substantially equal to the diameter of said second crop-transfer drum.

3. The improvement according to claim 1 wherein said plurality of crop-transfer drums comprises a first crop-transfer drum, a second crop-transfer drum, a third crop-transfer drum, and a fourth crop-transfer drum, positioned next to each other, all of said crop-transfer drums being rotated in the same rotational direction, said first crop-transfer drum being positioned furthest forward of said plurality of said crop-transfer drums in said travel direction of said windrower, said second crop-transfer drum being positioned adjacent said first crop-transfer drum, said third crop-transfer drum being swingable about said fourth crop-transfer drum from a position between and adjacent said second and fourth crop-transfer drums so as to form a gap between said second and fourth crop-transfer drums whose width is substantially equal to the diameter of said third crop-transfer drum.

4. The improvement according to claim 1 wherein said plurality of said crop-transfer drums comprises a first crop-transfer drum, a second crop-transfer drum, a third crop-transfer drum, a fourth crop-transfer drum, a fifth crop-transfer drum, and a sixth crop-transfer drum, said third crop-transfer drum being positioned next to said fourth crop-transfer drum, said second crop-transfer drum being swingable about said first crop-transfer drum from and to a position between said first crop-transfer drum and said third crop-transfer drum said fifth crop-transfer drum being pivotable about said sixth crop-transfer drum from and to a position between said fourth and said sixth crop-transfer drums to form a gap whose width is equal substantially to the diameter of said fifth crop-transfer drum, and to form a gap whose width is substantially equal to the diameter of said second crop-transfer drum.

5. The improvement according to claim 1 wherein said plurality is four and a forwardmost pair of said crop-transfer drums in said travel direction of windrower is positioned lower than a rear pair of said crop-transfer drums, said forwardmost pair of said crop-transfer drums being attached rotatably under an auxiliary support orientable parallel to said transverse support.

6. The improvement according to claim 5 wherein said auxiliary support is pivotable about said upright axis about which said adjacent one of said forwardmost pair of said crop-transfer drums is swung together with the other one of said forwardmost pair of said crop transfer drums substantially 180° in a horizontal plane.

7. The improvement according to claim 1 wherein all of said crop-transfer drums are set in rotation by a V-belt drive and the direction of rotation of the crop-transfer drum that is swung remains unchanged after pivoting.

8. The improvement according to claim 1 wherein the axes of said crop-transfer drums are inclined at acute angles to the ground so that the lower front edges of said crop-transfer drums in said travel direction of said windrower touches said ground.

9. The improvement according to claim 1 wherein adjacent the rearmost crop-transfer drum in said travel direction of said windrower, a vertically oriented swath board extending parallel to said travel direction is positioned, the spacing of which from said rearmost crop-transfer drum is adjustable.

10. The improvement according to claim 1 wherein under at least every second crop-transfer drum a centrally oriented wheel is provided, so that after pivoting one of said crop-transfer drums having said wheel the clearance of said crop-transfer drum from said ground remains the same as said clearance prior to pivoting.

* * * * *